(12) United States Patent
Jaeger et al.

(10) Patent No.: US 8,199,114 B1
(45) Date of Patent: Jun. 12, 2012

(54) TOUCH SENSOR CONTROL DEVICES

(76) Inventors: Denny Jaeger, Oakland, CA (US);
Kenneth M. Twain, Oakland, CA (US);
John Ream, San Jose, CA (US)

( * ) Notice: Subject to any disclaimer, the term of this patent is extended or adjusted under 35 U.S.C. 154(b) by 2862 days.

(21) Appl. No.: 09/670,610

(22) Filed: Sep. 26, 2000

(51) Int. Cl.
*G06F 3/041* (2006.01)
*G06F 3/033* (2006.01)
*G09G 5/00* (2006.01)
*G06K 11/06* (2006.01)

(52) U.S. Cl. ........ 345/173; 345/161; 345/179; 345/184; 178/18.01; 178/18.03; 178/19.01

(58) Field of Classification Search .................. 345/173, 345/174, 179, 184, 161, 160, 157, 702, 175, 345/158, 167; 178/18.01, 19.01–20.01, 18.03–18.07; 348/14.03
See application file for complete search history.

(56) References Cited

U.S. PATENT DOCUMENTS

| | | | | |
|---|---|---|---|---|
| 5,294,792 A * | 3/1994 | Lewis et al. | ................. | 250/221 |
| 5,355,148 A * | 10/1994 | Anderson | | |
| 5,794,145 A * | 8/1998 | Milam | | |
| 5,973,677 A * | 10/1999 | Gibbons | ................. | 345/179 |
| 5,977,955 A * | 11/1999 | Jaeger | | |
| 5,982,355 A * | 11/1999 | Jaeger et al. | | |
| 5,986,224 A * | 11/1999 | Kent | ................. | 178/18.04 |
| 6,057,830 A * | 5/2000 | Chan et al. | | |
| 6,072,475 A * | 6/2000 | van Ketwich | | |
| 6,088,069 A * | 7/2000 | Farlow | ................. | 349/12 |
| 6,184,865 B1 * | 2/2001 | Zimmerman et al. | | |
| 6,219,035 B1 * | 4/2001 | Skog | | |
| 6,249,277 B1 * | 6/2001 | Varveris | ................. | 345/179 |
| 6,255,604 B1 * | 7/2001 | Tokioka et al. | ................. | 178/18.01 |
| 6,326,956 B1 * | 12/2001 | Jaeger et al. | | |
| 6,337,918 B1 * | 1/2002 | Holehan | | |
| 6,388,655 B1 * | 5/2002 | Leung | | |
| 6,492,978 B1 * | 12/2002 | Selig et al. | ................. | 345/173 |

OTHER PUBLICATIONS

MicroTouch—TouchTek 4 (specification).
MicroTouch—TouchTek 5 (specification).
MicroTouch—ClerkTek 3000 (specificaiton).

* cited by examiner

*Primary Examiner* — Hau Nguyen

(57) ABSTRACT

The invention provides mechanical devices to enhance the input process for touch screen devices. Fader tracks with or without fader caps, rotary and fixed knobs, and joysticks may be removably adhered to a touch screen and used to emulate their respective functions, using software interpretation of the touch detections provoked by the devices to carry out the emulations. The devices are inexpensive and simple, and the touch screen and associated software provide the function and feel of electromechanical controllers that are far more expensive and difficult to connect and maintain. The devices may be provided as components on a crack-and-peel sheet. For fixed knobs, the software application accepts initial inputs and determines the location on the touch screen, and also interprets the geometry of the input strokes as commands for selected controller emulations, such as joystick, fader, knob, or mouse. The invention also provides a touch sensor controller having a longitudinal web that incorporates touch sensor electrodes and conductors and emulates a fader controller. The invention further provides a flexible track controller mounted at the periphery of a touch screen and extendable thereover to emulate a fader controller. The flexible track may be motor driven.

11 Claims, 12 Drawing Sheets

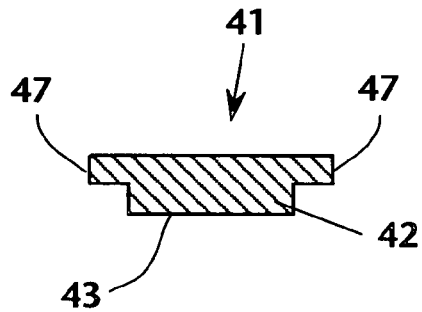
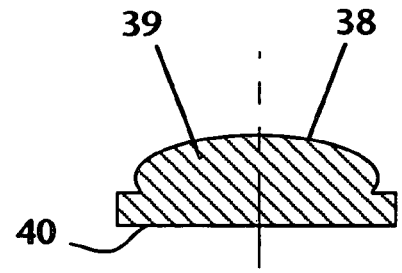
FIG. 1
FIG. 2
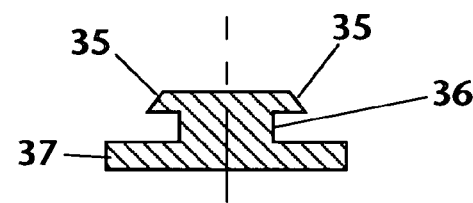
FIG. 3
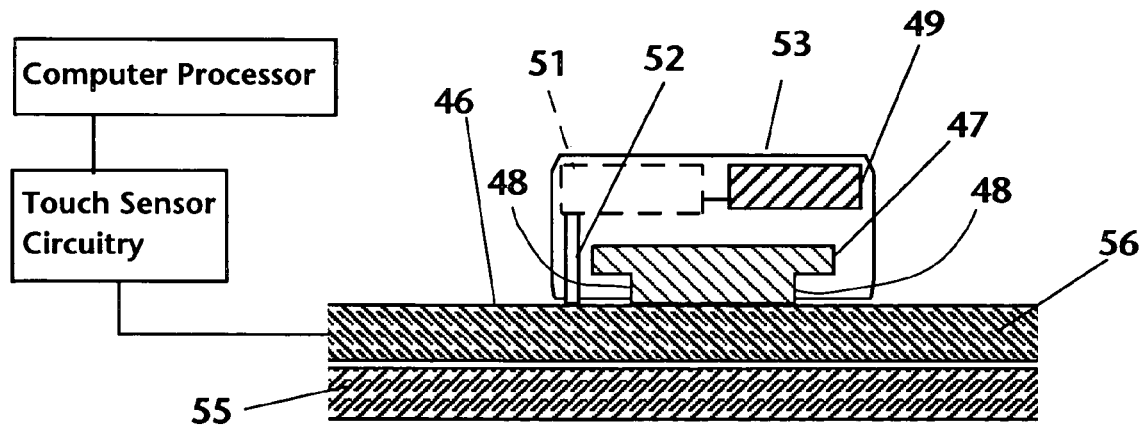
FIG. 4

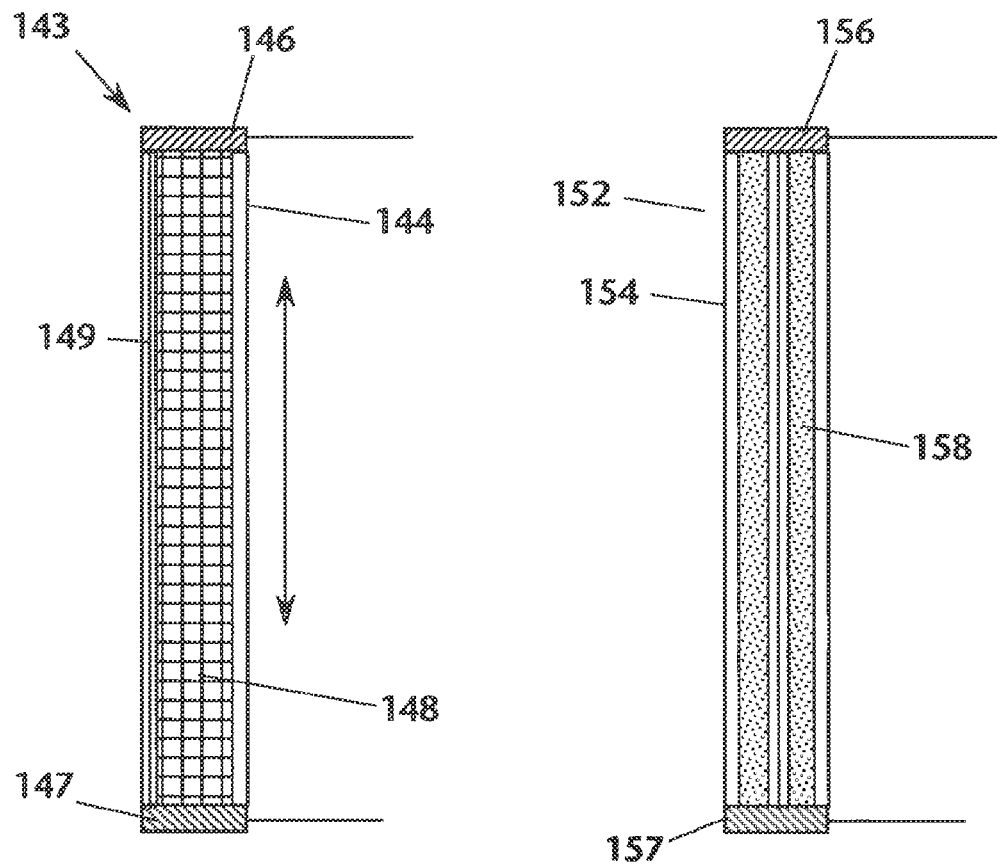
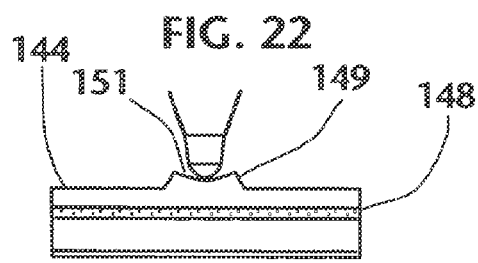
FIG. 24
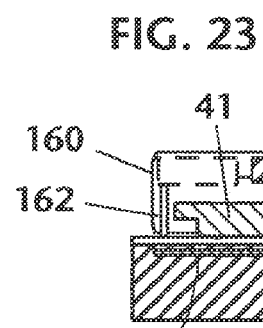
FIG. 25
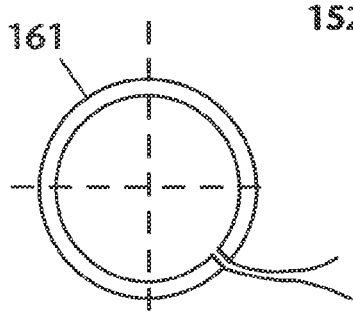
FIG. 26

TOUCH SENSOR CONTROL DEVICES

BACKGROUND OF THE INVENTION

This invention relates to touch screen input devices and, more particularly, to mechanical enhancements to touch screens.

Touch screen devices have become a commonplace user interface for electronic devices, computers, and the like. Touch screens are typically combined with a display screen which is in close proximity to the touch screen or which projects images through the touch screen. Under software control, the display may present images, video, alphanumeric information, and various combinations thereof. Moreover, the display may define corresponding areas of the touch screen as control input areas, through the presentation of control command words, iconic or graphic representations of controls, or the like. Thereafter, an operator touch at an appropriate portion of the touch screen causes the software to correlate the touch position with the control command defined by the display at that position, and to act on that command.

Touch screen sensor devices use many different operating principles, including infrared, capacitive sensor or resistive sensor techniques. Resistive sensor screens typically establish voltage gradients across orthogonal axes, and sense the touch point based on the voltage detected at a touch point as a ratio of the gradient. Capacitive sensor screens detect a signal input at a touch point, based on the capacitive coupling of a body through the tip of the finger impinging on the screen, or based on a signal transmitted from the tip of an input stylus. Some capacitive touch screens are designed to be placed behind a flat panel display, with a cover glass over the display. Others must be mounted over the top surface of a flat panel display. These latter devices may require touch sensing means on both the top and bottom surfaces of the touch screen, whereas others may require sensing means on only one surface, either front or back. Some touch sensor screens are capable of operation with a cover plate (superstrate) placed over the touch screen.

Touch screen technology is well adapted to eliciting operator inputs that are binary in nature: On/Off, Yes/No, Up/Down, Start/Stop, and like commands, that may be indicated with a single touch. There are other types of inputs, such as continuously variable values or functions, that many individuals prefer to control with real, palpable mechanical devices that permit a fine touch to be associated with a precisely selected level. For these inputs, a touch screen has not been well suited. Although a continuous gradient may be displayed as an image on a monitor or a flat panel display, and detected by a touch on a touch screen, it is necessary to slide the touch finger (or a stylus) along a graphic representation of a track or gradient that is displayed but lacks any physical structure or boundary. This action is difficult or awkward for many individuals, and requires that the user look at the displayed graphics in order to guide the controlling touch. In addition, many touch screens present an outer surface that is not well suited to sliding contact; e.g., the glass or plastic outer surface may lack sufficient lubricity.

The prior art reveals a lack of devices that may be used to make inputs to a system using a touch screen. On the other hand, the concept of combining electronic image display screens with operator input sensor apparatus correlated to the images presented on the display screen is well known in the prior art, as exemplified by the U.S. patents issued to the present inventor:
U.S. Pat. No. 5,572,239
U.S. Pat. No. 5,977,955
U.S. Pat. No. 5,805,146
U.S. Pat. No. 5,805,145
U.S. Pat. No. 5,936,613
U.S. Pat. No. 5,774,115

SUMMARY OF THE INVENTION

The present invention generally provides mechanical devices to enhance the input process for touch screen devices. A salient feature of the invention is the inputting of continuously variable functions or data using mechanical devices that provide the touch and feel of prior art mechanisms, such as rotary knobs, fader (slider) devices, joysticks, switches, and the like.

In one aspect, the invention provides a fader track that is adapted to be releasably secured to the outer surface of a touch screen device. The fader track may comprise a longitudinally extending rib adapted to be releasably secured to a touch screen device. The bottom surface of the rib may be provided with a releasable adhesive that enables temporary adhesion and many cycles of removal and placement. The rib may serve as a guide for a sliding finger touch on the top surface thereof, and the material forming the fader track may provide the lubricity that is often lacking in the touch surface of touch screen devices.

The fader track may also serve as a mounting for a fader cap. In this embodiment the rib is provided with a pair of flanges disposed in lateral opposition and extending longitudinally therealong. The fader cap comprises an ergonomically shaped object designed for manual engagement, and includes a portion disposed to engage the flanges in freely sliding fashion therealong. For a capacitive touch screen, the fader cap incorporates a touch signal transmitting circuit connected to a power supply, and a stylus point extending from the cap adjacent to the rib to contact the touch screen surface and deliver the touch signal thereto. The power supply may comprise a battery, and/or a photovoltaic cell deriving power from the associated display or other light sources, or may comprise an RF or IR or other radiant energy source transmitted to a receiver in the fader cap. The fader track may also be placed in a grooved recess formed in the outer surface of the touch screen, or in a cover plate (superstrate) placed over the touch screen.

In a further embodiment, the fader track may be provided with one or more power rails extending longitudinally along the flanges thereof. The fader cap includes brush contacts that connect to the power rails, whereby the power rails may deliver a power signal or a touch signal to the fader cap. The power rails may be connected by a plug connector or the like to a power supply or signal generator, or may include connecting pads that electrically engage complementary pads on the surface of the touch screen, an adjacent circuit board, or a superstrate on the touch screen.

For a resistive touch screen device, the fader track transmits pressure from a finger touch sliding on the upper surface thereof to contact the touch screen and provoke a series of touch detections. The bottom surface of the rib that contacts the touch screen is substantially narrower than the upper surface thereof, whereby the touch pressure applied to the touch screen is amplified by the fact that the touch force is applied to the smaller area of the rib impinging on the touch screen. The bottom surface of the rib may be provided with a plurality of downward projections to further define the touch detection points.

In another aspect, the invention provides a knob controller that is adapted to be secured to the outer surface of a touch screen device, or on a cover plate or superstrate over the display. The knob may comprise a base member having a self-adhesive component for releasably engaging a touch screen surface. A knob cap is joined to the base in freely rotating fashion, and a sensor tip extends from the knob cap toward the touch screen, so that rotation of the knob cap causes the sensor tip to move through an arcuate path on the touch screen surface. A compression spring component may be interposed between the knob and its base, so that the sensor tip may be urged by manual pressure to impinge on the touch screen.

For capacitive touch sensor screens, the knob cap may house a power supply for driving a touch signal generating circuit to deliver the signal to the sensor tip. The power supply may comprise a battery, and/or a photovoltaic cell for generating power from the light received from the display or other extrinsic sources, or RF or IR or other radiant energy transmitted to a receiver in the knob cap.

For resistive touch sensor screens, the knob base may include a post extending outwardly therefrom and provided with an outer surface for engaging a finger tip. The finger tip is used to rock the post in a shallow circular motion, causing the outer edge of the knob base to impinge on and provoke a series of touch detections by the touch screen. These touch detections follow the angle of the rocking motion of the post to trace an arcuate path about the post on the touch screen, even though the post is not actually rotating. A joystick device for touch screens is constructed in similar fashion, with the base diameter and post length selected to optimize angular selectivity and radial vector inputs.

In a further aspect, the invention provides a switch mechanism that is removably secured to a capacitive touch screen surface. A switch base supports a switch cap that houses a touch signal generator, and a spring interposed between the cap and base enables the user to push on the cap and urge a sensor tip to touch the screen and deliver the touch signal to the screen for detection of the touch point. As before, the power supply may comprise a battery, a photovoltaic cell, external power rails extending to the switch, or any RF or IR or other radiant energy transmitted to the switch mechanism. Software interaction with the touch point results in a switch function being carried out.

In an additional embodiment, the invention provides a joystick input device that is securable to a touch screen surface. A joystick base includes a surface defining a bottom opening, and a self-adhesive component on the surface secures the base to the touch screen. A rod extends outwardly from the joystick base, and a membrane extending from the base engages the rod and supports it in limited angular movement through a circular locus. The outer end of the rod includes a knob for manual engagement, and the inner end of the rod includes a stylus tip for engaging the touch screen. A bearing may be provided to support the rod adjacent to the stylus tip.

For capacitive touch sensing screens, the joystick base may house a touch signal generating circuit and associated power supply, as described previously.

A further aspect of the invention is the provision of a touch screen device having a resistive or capacitive sensing surface that is divided into a plurality of discrete areas. Any one of the mechanical control devices described above may be secured to respective discrete areas of the touch screen device, whereby a plurality of mechanical control devices may operate simultaneously through interaction with the touch screen device.

A further aspect of the invention is the use of multiple mechanical control devices described herein used simultaneously with a capacitive sensor touch screen device. The touch signal generator of each controller device is assigned a predetermined frequency that is unique among all the devices being used with a touch screen device. The sensing circuitry of the touch screen is adapted to receive the discrete signals of the plurality of mechanical controllers, and to evaluate the discrete signals to determine the touch point of each mechanical controller.

In a related aspect, the invention provides a touch sensor fader track that incorporates a touch sensor device therein, and may be used in conjunction with a display that lacks any other touch screen capability, or may be added to a touch screen device. The fader track is formed as a longitudinally extending web, and a pair of sensor electrodes are embedded in the web at longitudinally opposed ends and connected to a conductive layer or grid incorporated in the web. A longitudinally extending power rail is connected to a sensor signal generator, and the sensor electrodes are connected to electronic devices that detect a touch position on the web as a signal ratio from the electrodes. This device may be self-adhered to the surface of a display screen, or may be placed in a groove that is formed in the surface of a display screen, cover plate, superstrate, or touch screen. In an associated embodiment, the longitudinal axis of the device may be curved into a closed loop to form a fader track that mimics the progressive angular input of a mechanical knob. In either case, the web may include a longitudinally extending groove or ridge to guide a finger touch therealong.

In a further aspect related to external touch sensor devices, the invention provides a fader control for a touch screen device that includes a flexible, ribbon-like track member secured to a structure such as a bezel or frame at or outside the margin of a touch screen device. The flexible track is extendable along an axis that that is directed inwardly with respect to the touch screen margin, and a sensor tip is mounted in the distal end of the flexible track to impart a detectable touch to the touch screen device. For a capacitive touch screen, the sensor tip is connected to a touch signal generator.

As an extension of this further aspect of the invention, the proximal end portion of the flexible track may pass about a drive wheel or sprocket which is operatively connected to a drive motor. Under software control, the motor may be driven to rotate the wheel or sprocket to extend or retract the flexible track to a preset length. Thereafter, the operator may use fingertip pressure applied to the distal end of the flexible track to further extend or retract the track, the sensor tip traversing the touch screen and imparting a moving touch point thereto.

Any of the devices described above may be placed on the active surface of a resistive or capacitive touch screen. Thereafter, the device is operated; i.e., the knob or joystick is rotated, the fader controller is slidably actuated. The system software receives the resulting touch inputs and analyzes them to determine the location and type of device that has been operated. The invention includes software modules that receive and interpret control inputs from the devices described herein, and initiate specific controller functions in response to the inputs. For example, the knob controller for resistive touch screen use may be rotated to evoke a rotary knob function response, or actuated along an orthogonal axis to evoke a fader controller response, or actuated along an oblique axis to evoke a joystick function or mouse function response.

The various embodiments of the invention provide the following advantages over the prior art:

1. Much lower cost. The controller devices of the invention cost much less that existing mechanical controllers for electronic use. The embodiments designed for use with resistive touch screens have no electronics at all and are therefore very inexpensive. They are mechanical components which accomplish the equivalent of very complex and much more expensive knobs, faders and joysticks. The controllers for resistive touch screen use can cost pennies per unit to produce. The devices adapted for capacitive touch screen use incorporate only minimal electronics, and are also very inexpensive compared to comparable stand-alone controllers known in the prior art.

2. Reduced electronic components: All of the electronics required to detect and transmit individually the movement and position of each discrete knob, fader, joystick, and the like in the prior art is replaced by one touch screen. Thus a great amount of discrete, high resolution, expensive electronics are obviated. For use with resistive touch screens, no electronics are required in the devices of the invention. For use with capacitive touch screens, only minimal electronics that generate a touch signal at a specific frequency from the various knob, fader, or joystick controllers are required. The power consumption for these devices is minimal, far less than the comparable discrete devices of the prior art.

3. Removable devices: The controller devices of the invention (both resistive and capacitive) are removable, and may be placed on a touch screen (or cover glass) and removed many times. This aspect provides several benefits: device re-use is economical, and removable devices enable the setup of custom controller configurations in a few simple steps. Moreover, the devices may be removed at any time to clear the entire expanse of the touch screen for typical prior art touch screen functions.

4. Self activating devices: The controller devices of the invention (both resistive and capacitive) are self-activating under software control. When one of these devices is placed on a touch screen, the system software determines the location of the device on the touch screen, and the software creates a parameter window that enables the user to see the rotation (knob), fader position, or joystick envelope as a changing graphic on the display immediately below the device. The parameter window may be positioned anywhere on the display associated with the touch screen, or may be located on the display at positions related to the placement of the respective controller devices on the touch screen.

5. Economy of scale: The use of software to emulate a wide range of control functions takes advantage of a microprocessor's ability to perform repetitive tasks reliably and cheaply, and obviates the need for prior art mechanical controllers that can be very expensive, require maintenance, and may be difficult to connect.

6. The various devices described herein may be placed anywhere in the viewing area of a display or within the active surface of a touch screen, and operated, and likewise may be moved or removed by the user.

BRIEF DESCRIPTION OF THE DRAWING

FIG. 1 is an end view of a fader track controller for use with a touch screen in accordance with the present invention.

FIG. 2 is an end view of a further embodiment of a fader track controller for use with a touch screen in accordance with the present invention.

FIG. 3 is an end view of a further embodiment of a fader track controller for use with a touch screen in accordance with the present invention.

FIG. 4 is a cross-sectional end elevation of fader track mechanical control with fader cap for use in conjunction with a capacitive touch sensor device.

FIG. 22 is a plan view of a capacitive touch sensor fader controller.

FIG. 23 is a plan view of a resistive touch sensor fader controller.

FIG. 24 is an end view of the controllers shown in FIGS. 22 and 23.

FIG. 25 is a cross-sectional end view of a resistive touch sensor fader controller incorporating a sliding fader cap.

FIG. 26 is a plan view of a touch sensor controller formed in a closed curved loop to emulate a rotating knob function.

DESCRIPTION OF THE PREFERRED EMBODIMENT

Figure 5:
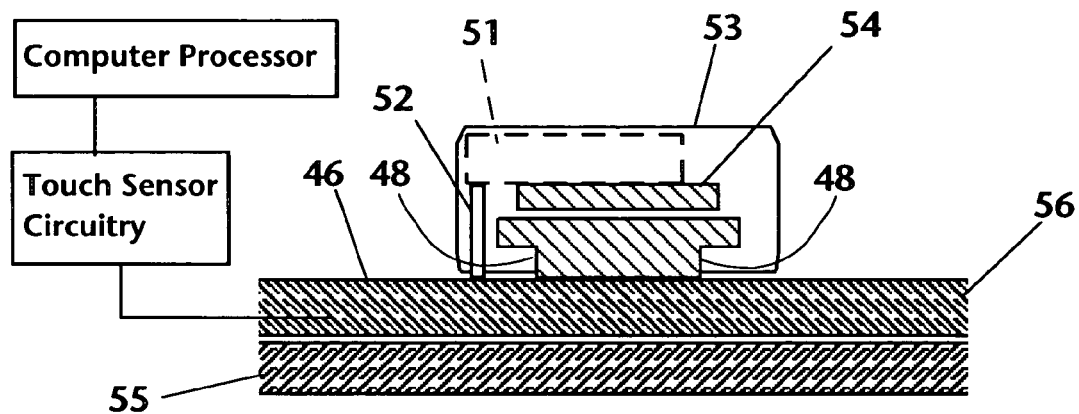
FIG. 5 is a cross-sectional end elevation of fader track mechanical control with fader cap as in FIG. 4, with a photovoltaic cell power source.

The present invention generally provides mechanical devices to enhance the input process for touch screen devices.

With regard to FIG. 1, one embodiment of the invention comprises a fader track controller 41 including a longitudinally extending rib 42 having a bottom surface 43 formed longitudinally therein provided with a releasable adhesive that enables temporary adhesion and many cycles of removal and placement with respect to a touch screen or its cover glass or superstrate. The rib 42 acts as a guide for a gliding finger touch to emulate the smooth longitudinal motion of a mechanical fader controller known in the prior art. The rib 42 may be formed of a lubricious plastic or polymer material that facilitates a sliding touch. The rib 42 may be placed anywhere on the touch screen surface 44, and the associated display of an electronic device may be programmed to present labeling and indicia appropriate for the desired function and range of the controller 4L The rib 42 may be removed and reused repeatedly. Note that the rib may be formed of transparent or translucent material to permit visualization of an underlying graphic display, or may be opaque, as is appropriate for the situation.

With regard to FIG. 2, the fader track controller 41 may alternatively provide a base panel 40 that supports a rail 39 having a smoothly curved cross-sectional surface 38. The surface 38 described an angle of more than 180°, forming a smooth contour that accepts a finger touch. In addition, the cap embodiment (below) may gain purchase on the rail 39 to prevent cap removal while permitting free sliding translation therealong. Likewise, in FIG. 3 a fader track controller may provide a base panel 37 extending longitudinally, with a rib 36 extending outwardly therefrom. A pair of flanges 35 are disposed in lateral opposition and extend laterally along the rib 36. The embodiments of FIGS. 1-3 illustrate a few possible track configurations, although many equivalent formations are possible With regard to FIG. 4, the fader track controller 41 may be modified by the addition of a sliding fader cap 53 to provide the tactile sensation of a moving object to control an input variable to a touch screen device. The cap 53 includes a pair of opposed tabs 48 extending laterally toward each other to engage therebetween the flanges 35 or 47 (or the rail 39) and retain the cap 53 in a sliding relationship on the track 41. The cap 53 incorporates a touch signal transmitting circuit 51 connected to a battery 49, and a stylus point 52 extends from the cap adjacent to the track 41 to contact the touch screen surface 46 and deliver the touch signal thereto. The cap 53 may be urged by fingertip pressure to slide along the track 41, the stylus point (also know as a sensor tip) 52 imparting the touch signal to the touch screen to provoke touch detection thereof along the track 41. (This touch detection technique is well known in the prior art.) This action provides a smooth, continuously variable control function closely akin to a mechanical fader controller device known in the prior art.

With regard to FIG. 5, the device of FIG. 4 may be modified by replacing the battery power supply with a photovoltaic cell 54 within the cap 53. The photovoltaic cell 54 is supported closely adjacent to the surface 44 to receive light from the display 55 associated with the touch screen device. The cell 54 powers the signal generator 51 so that the device operates without external power connections and without the need for battery replacement. In both the embodiment of FIGS. 4 and 5, the touch screen device 56 is connected to touch screen circuitry common in the art that detects the touch signal and its location, and transfers this data to a computer processor connected to graphic display 55 to carry out a control, command, or input function. (Note that the track 41 may be fabricated of light-transmitting material, and also the relative widths of the track 41 and photovoltaic cell 54 are not necessarily to scale.)

In all the embodiments of the invention in which adhesive or self-adhesive materials are mentioned, it is presumed that the adhesive is preferentially more adherent to the device of the invention rather than the touch screen, display screen, cover glass, or the like.

Figure 6:
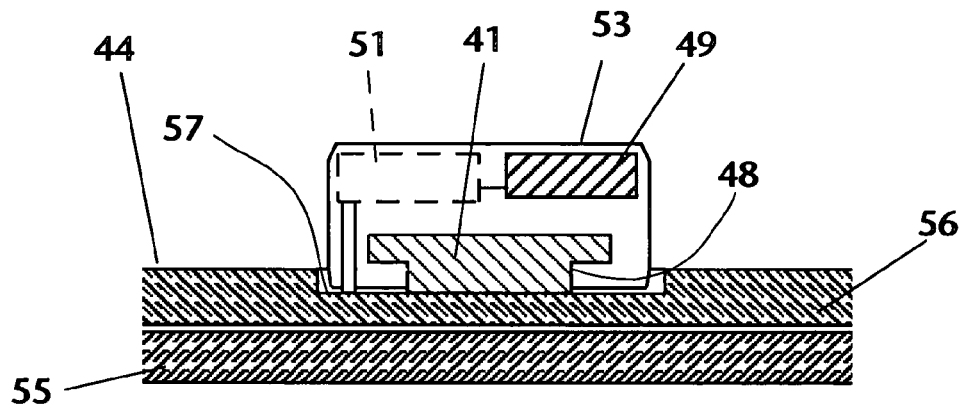
FIG. 6 is a cross-sectional end elevation of fader track mechanical control with fader cap as in FIGS. 4 and 5, installed in a groove formed in a touch screen device.
Figure 10:
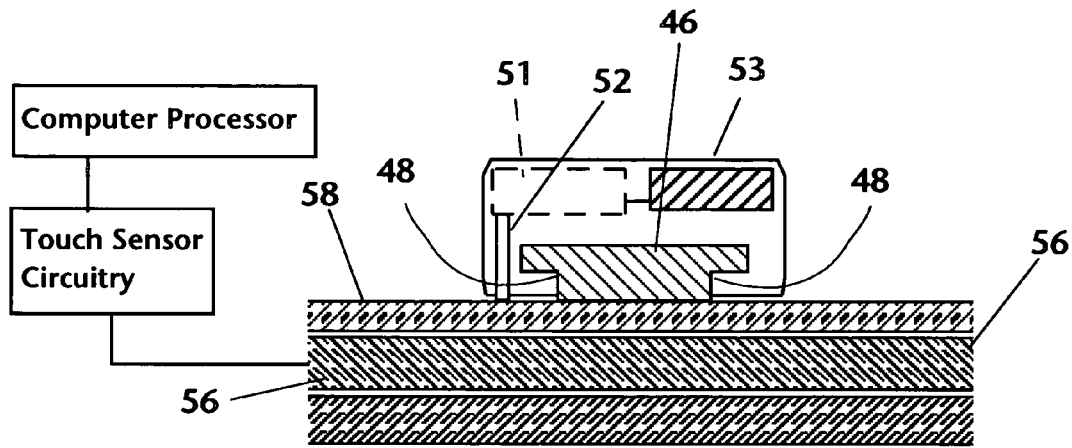
FIG. 10 is a cross-sectional end elevation of fader track mechanical control with fader cap for use in conjunction with a capacitive touch sensor device and a cover glass (superstrate).

With reference to FIG. 6, the embodiment of FIG. 5 (and FIG. 4) may be installed in a grooved recess 57 in the surface 44 of the touch screen device 56 that is associated with a graphic display 55. Likewise, these embodiments may be in a grooved recess of a cover plate or superstrate placed over the touch screen device 56. Likewise, as shown in FIG. 10, the embodiments of FIGS. 4 and 5 may be secured on the outer surface of a cover glass (superstrate) 58 which is placed over the touch screen device 56 and an associated graphic display 55. Also, any knob embodiment described herein may be installed in a grooved recess similar to that shown in FIG. 6.

Figure 7:
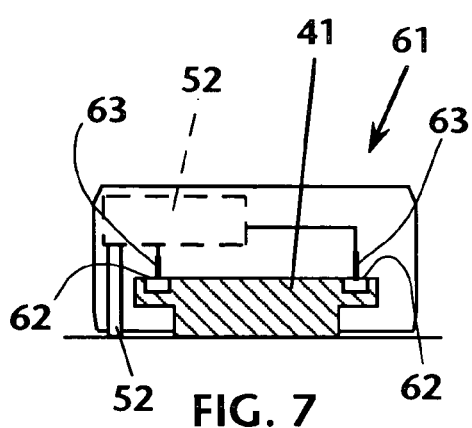
FIG. 7 is an end view of the fader cap and fader track devices of FIGS. 8-10.
Figures 8, 9:
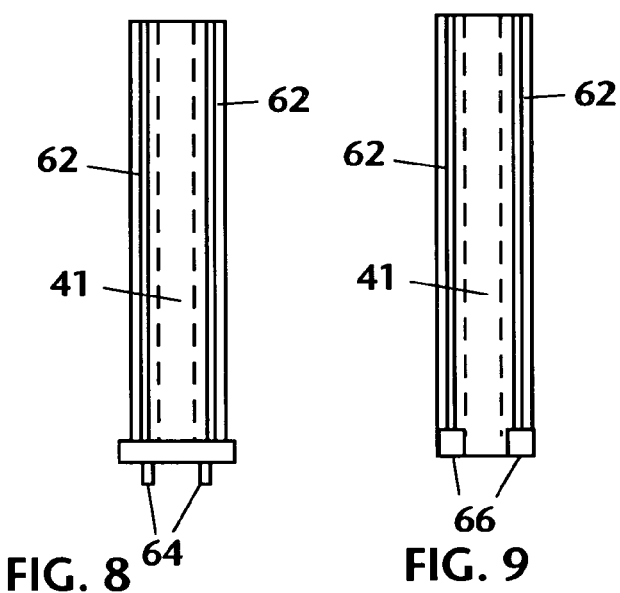
FIG. 8 is a plan view of a fader track mechanical control for use with a touch screen and including power rails and plug connectors for driving a touch signal generator.
FIG. 9 is a plan view of a fader track mechanical control as in FIG. 8, with pad connectors for signal connection to the fader track.

With regard to FIGS. 7-9, the invention also includes a fader track controller 61 having a longitudinally extending web track 41. A pair of power rails (conductors) 62 extend longitudinally in the upper surface of the track 41, and a fader cap 53 assembled to the track 41 includes a pair of contacts 63 for electrically engaging the power rails 62 and providing power to the touch signal generator 51. (The power rails may be placed in any surfaces of the track 41.) Other aspects of this embodiment remain as described previously. As shown in FIG. 8, a pair of connector pins 64 joined to the power rails may extend from one end of the rib 41 to connect to a power cable or the like.

Alternatively, as shown in FIG. 9, a pair of connector pads 66 joined to the power rails may be formed at one end of the track 41. For some embodiments more than two power rails may be provided. The connector pads 66 may connect to a plurality of power conductors disposed on a circuit board located at or proximate to the periphery of the touch screen. The electrical engagement of the pads 66 with the conductors permits the device of FIG. 9 to be placed at any location along the conductors. Furthermore, multiple devices may be placed on the touch screen at any desired spacing and powered by the conductors. Alternatively, conductors may be placed on the surface of a touch screen device or on a superstrate placed over a touch screen device. The use of power rails and connector pins or pads may be combined where appropriate with any of the embodiments described in this application.

With regard to FIGS. 11 and 12A-12D, the invention provides a knob controller 71 for operation with a resistive touch screen device. The knob controller 71 includes a generally cylindrical component 72 (in FIGS. 12A-12D) having a releasable adhesive 73 on the flat bottom surface thereof that is adapted to removably secure the knob on the surface 74 of a resistive touch screen device. The upper surface 76 of the component 72 is designed to invite finger touch, and may be slightly roughened to prevent the finger from slipping. The adhesion of the base to the touch screen does not provoke a touch response.

Figure 11:
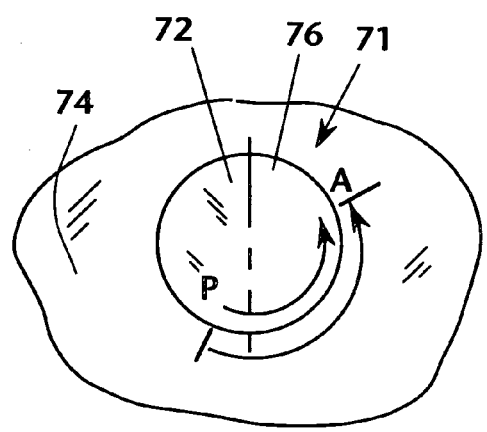
FIG. 11 is a plan view of a knob controller for use with a resistive touch screen device.
Figure 12A:
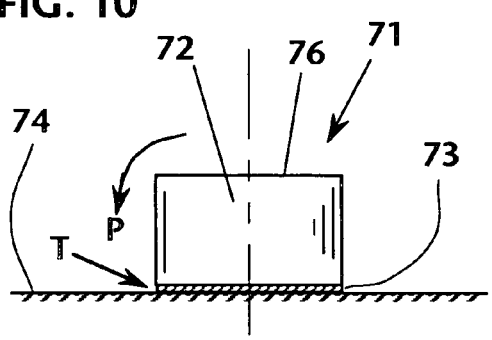
FIGS. 12A-12D are side elevations various embodiments of a knob controller for use with a resistive touch screen device.

As shown in FIG. 12A, fingertip pressure P applied eccentrically at the upper surface 76 causes the corresponding lower edge of the member 72 to impinge sharply on the touch screen surface 74 and provoke a touch detection T. Likewise, as shown in FIG. 11, fingertip pressure P applied along a peripheral edge portion of the upper surface results in the corresponding lower edge provoking touch responses throughout the angular span A, which may be easily associated by software with the rotation of a mechanical knob controller known in the prior art. The peripheral edge touch in a circular fingertip motion is a natural gesture, and an operator may input an angular excursion ranging from a small angle to several rotations about the axis of the knob. Note that the knob itself does not rotate, but the touch it provokes on the touch screen device appears to rotate. The scale associated with one rotation of the knob may be selected so that the device 71 may be used to input within a wide range (several rotations), or with extreme precision within a defined range.

Figure 12B:
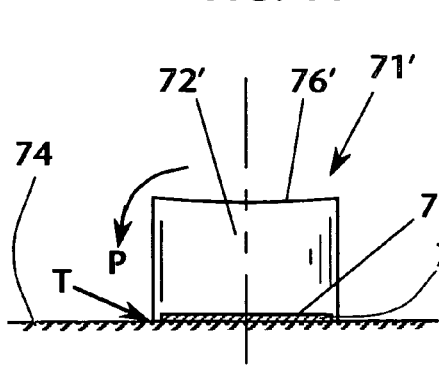

With regard to FIG. 12B, an alternative embodiment of FIG. 12A includes similar components having the same reference numeral with a prime(') designation. The lower surface of the knob 72' is provided with a cylindrical recess 77 in which an adhesive layer 78 is secured. The adhesive layer is preferably slightly greater in height than the depth of the recess 77, so that the lower peripheral edge portion of the knob 72' is spaced minimally from the surface 74 of the resistive touch screen device. The top surface 76' is dished to accommodate the convex curvature of a fingertip. Fingertip pressure as described above drives the thin lower peripheral edge of the knob 72' into the touch screen to provoke a touch detection that may have a smaller, sharper detection area.

Figure 12C:
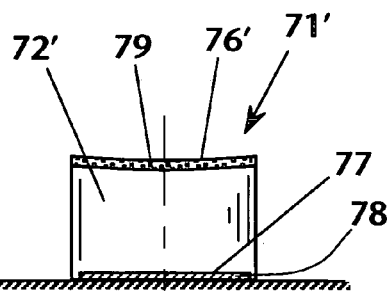

With regard to FIG. 12C, an alternative embodiment of FIGS. 12A-12B includes similar components having the same reference numeral with a prime(') designation. The lower surface of the knob 72' is provided with a cylindrical recess 77 in which an adhesive layer 78 is secured, as before. In addition, the dished upper surface 76' is provided with a soft cushion layer 79 for enhanced tactile sensation and to protect the finger by providing a yielding surface for tactile engagement.

Figure 12D:
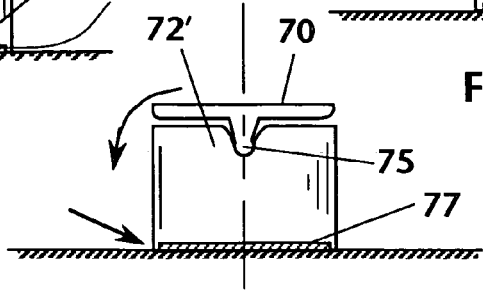

With regard to FIG. 12D, an alternative embodiment of FIGS. 12A-12C includes similar components having the same reference numeral with a prime(') designation. The upper surface of the knob is provided with a rocker plate 70, a disk-like structure having a central post 75 snap-engaged in a central opening in the top of the knob 72'. The disk is spaced slightly above the top surface 76' of the knob, and the snap-engagement permits free angular movement of the rocker plate. Thus fingertip pressure applied to the top of the rocker plate 70 causes it to wobble about the axis of the central post 75. The wobble motion enhances the effectiveness of an off-center finger touch to drive the lower peripheral edge of the knob into the touch screen.

Figure 13:
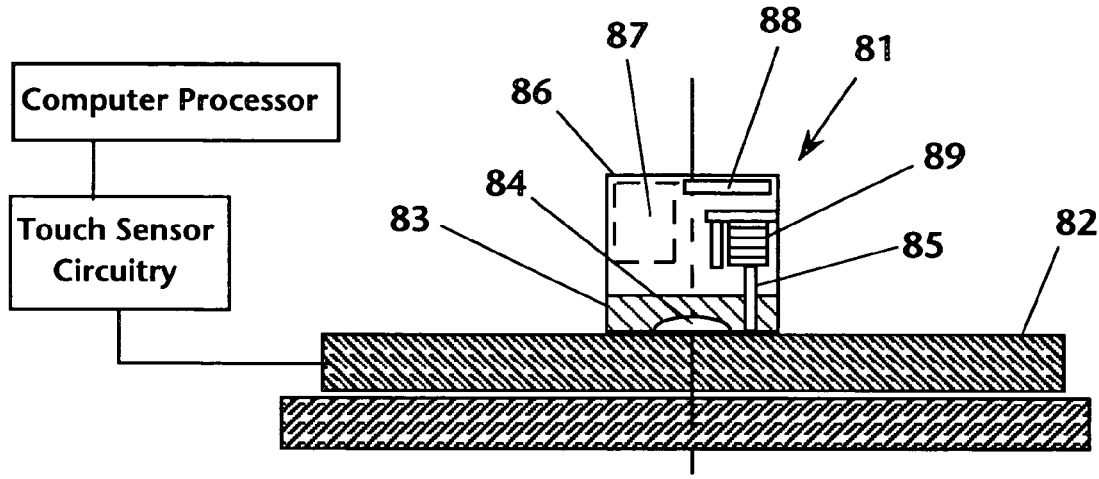
FIG. 13 is a cross-sectional elevation showing a knob controller for use in conjunction with a capacitive touch sensor device.
Figure 14:
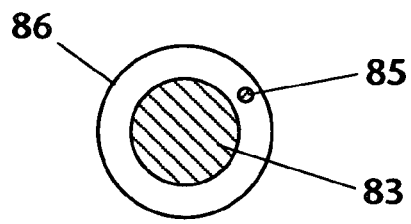
FIG. 14 is a cross-sectional view of the knob controller shown in FIG. 13.

With regard to FIGS. 13 and 14, the invention also provides a knob controller 81 for use with a capacitive touch screen. The knob controller 81 includes a base 83 secured to the outer surface of a touch screen device 82 (or a cover plate) by a suction cup device 84, although releasable adhesive may be used equally effectively. A knob cap 86 is rotatably secured to the base 83, and includes a sensor tip (stylus tip) 85 extending from the cap 86 toward the touch screen. A compression spring 89 may be interposed between the cap and the sensor tip to bias the tip to impinge on the touch screen 82. A touch signal generator 87 is disposed within the cap 86, as well as a battery power supply 88.

The sensor tip 85 transmits the touch signal from generator 87 to the screen 82 to provoke a touch detection. Angular movement of the knob 86 causes the sensor tip 85 to move over the touch screen in an arcuate path which is detected and converted to angular excursion and speed of movement for control input purposes. As in previous embodiments, the knob power supply may comprise a photovoltaic cell to derive power from the associated display, RF, IR, or equivalent radiant power transmission, or conductors extending to the knob controller 81. The system software may recognize the loop traced by the tip 85, determine the center, and cause the associated display to present a knob graphic, or other representation of the rotary knob controller. Movement of the touch detection along an arcuate path is interpreted by the software as a change in the variable or function associated with the knob, and that changing variable may be displayed alphanumerically or graphically at any location on the associated display, or at a location proximate to the graphic representation of the knob on the display.

Figure 15:
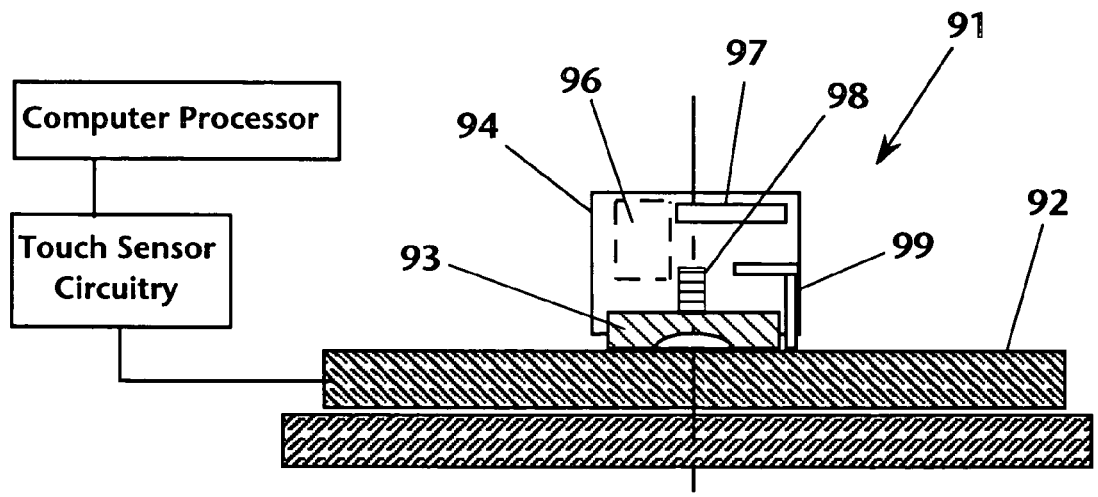
FIG. 15 is a cross-sectional elevation of a switch controller for use in conjunction with a capacitive touch screen device.

With regard to FIG. 15, the invention further provides a switch controller 91 for use with a capacitive touch screen 92. The controller 91 includes a base 93 adhered (by any means disclosed herein) to the outer surface of the touch screen 92, and a switch cap 94 secured to the base in vertically translatable fashion. A touch signal generator 96 and power supply 97 are disposed within the cap 94, the signal generator being connected to a stylus tip 99 that extends from the cap toward the touch screen 92. A spring 98 resiliently biases the cap away from the touch screen and maintains the stylus tip out of contact with the touch screen. Fingertip pressure on the knob cap overcomes the spring force and urges the stylus tip to impinge on the touch screen and provoke a touch detection. Software interaction with the touch point results in a switch function being carried out. Although a touch screen may be tapped directly with a fingertip to mimic a switch function, the embodiment of FIG. 15 may have utility in situations where an individual is wearing gloves (in a laboratory or industrial setting, for example) and touch detection is problematic, or where manual contact with the screen would soil the screen surface.

Figure 16:
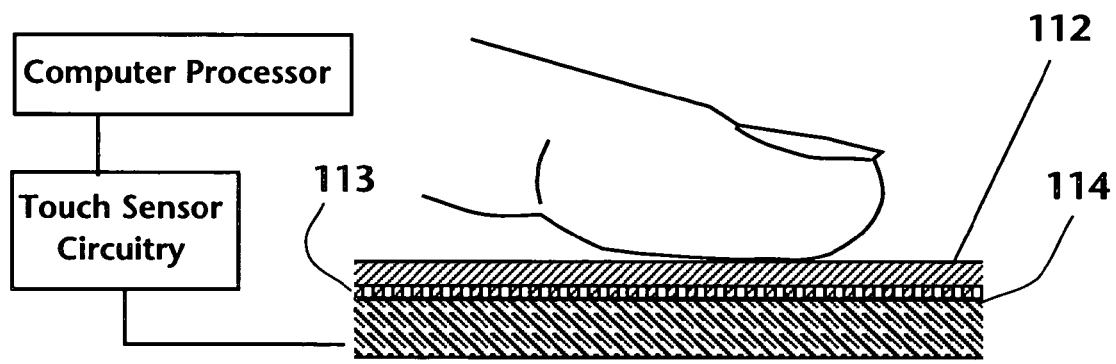
FIG. 16 is a cross-sectional elevation of a fader track controller for use in conjunction with a resistive touch screen device.

With regard to FIG. 16, a fader controller 111 for a resistive touch screen includes a longitudinally extending track 112 having a configuration functionally similar to the embodiments of FIGS. 1-3. A releasable adhesive is applied to the bottom surface of the track 112 to removably secure the device 111 to the outer surface 114 of a touch screen assembly. The bottom surface of the track 112 may further includes a plurality of downwardly projecting feet 113 that impinge on the touch screen surface. The feet tend to increase the pressure (force per unit area) within a small footprint on the touch screen, enhancing the touch detection on resistive touch screens.

Figure 17:
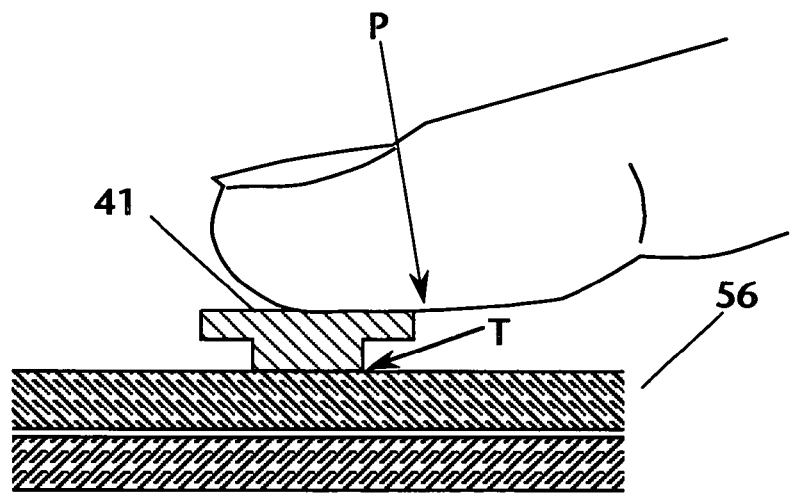
FIG. 17 is a cross-sectional end elevation of a fader controller for use in conjunction with a touch screen device.

With reference to FIG. 17, any of the track configurations 41 of FIGS. 1-3 may be applied to surface 114 of a resistive touch screen. Fingertip pressure P on the top surface tends to rock the track 41 about its longitudinal axis, driving one edge of the lower rib into the screen and amplifying the touch pressure by applying it to a small screen area. This effect is also operative in conjunction with those capacitive sensing touch screen devices that respond differentially to applied pressure.

Figure 18:
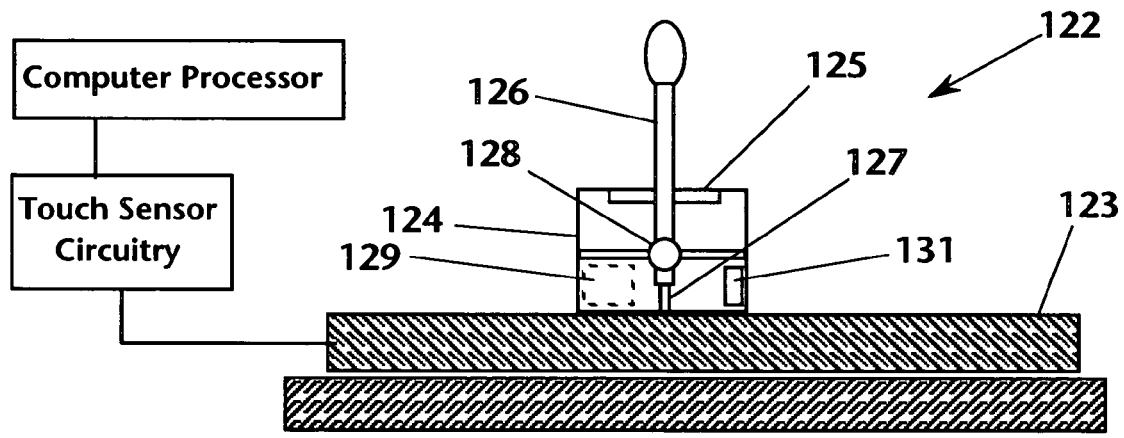
FIG. 18 is a cross-sectional elevation of a joystick controller for use in conjunction with a capacitive touch screen device.

With regard to FIG. 18, the invention also provides a joystick controller 122 for use with a capacitive touch screen 123 associated with a graphic display 120. A base 124 is adhered to the surface of the screen 123 (by any means disclosed herein), and defines a bottom opening adjacent to the screen 123. A control rod 126 includes an outer end having a knob for manual engagement, and an inner end having a telescoping tip 127 that is spring biased to contact the screen 123. The rod 126 is secured in a universal bearing 128, and a membrane 125 extends radially from an upper portion of the rod 126 to the base 124 to permit limited angular excursions of the knob and complementary angular excursions of the tip 127 on the touch screen 123. A touch signal generator 129 is secured in the base and is connected to the tip 127, and a battery power source 131 is connected to the signal generator. The telescoping tip 127 maintains contact with the touch screen as the knob end is moved through angular excursions about the bearing axis.

Figure 19:
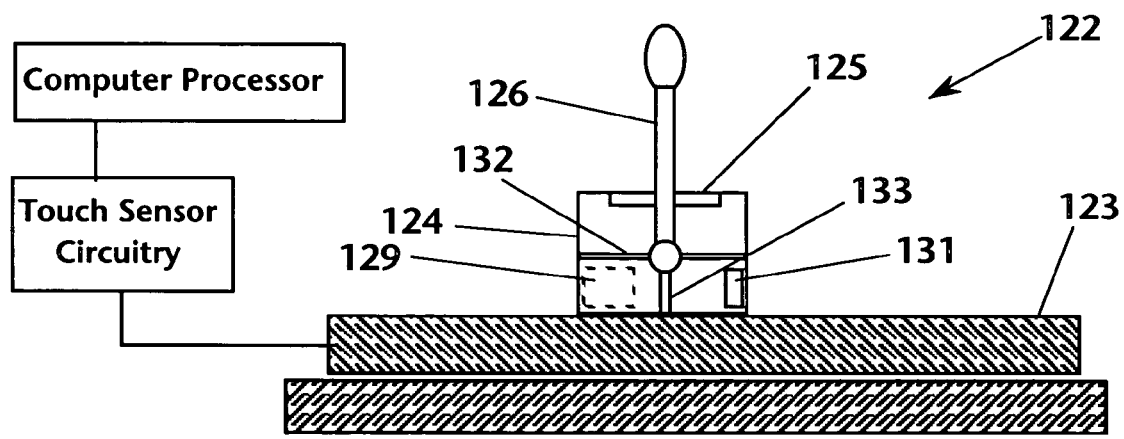
FIG. 19 is a cross-sectional elevation of a further embodiment of a joystick controller for use in conjunction with a capacitive touch screen device.

With regard to FIG. 19, a further embodiment of the joystick controller 122' includes similar components similarly numbered. The bearing is replaced by another membrane 132 extending radially from a lower end portion of the rod 126, and the telescoping tip is likewise eliminated. The two membranes permit angular movement of the rod 126, and also permit downward force applied manually to urge the fixed tip to impinge on the touch screen and impart a touch point or a touch path thereto.

Both embodiments described in FIGS. 18 and 19 provide a high resolution joystick input function for a capacitive touch screen, a function that may be only crudely emulated by a moving fingertip touch on the touch screen. Moreover, the device 122 creates a joystick input without requiring the user to look at the display 120, whereas any (prior art) virtual joystick portrayed on the display 120 demands visualization by the user for accurate use. This requirement is akin to an automobile driver being required to watch the steering wheel rather than the road and oncoming traffic.

In any of the embodiments described herein in which a touch signal generator feeds a signal to a stylus tip to provoke a touch detection, it is noted that the stylus tip need be only in close proximity to the surface of the touch screen device, and may not actually impinge on the surface. This aspect reduces wear on the touch screen, and reduces the potential for scratching the surface of the touch screen.

Figure 20:
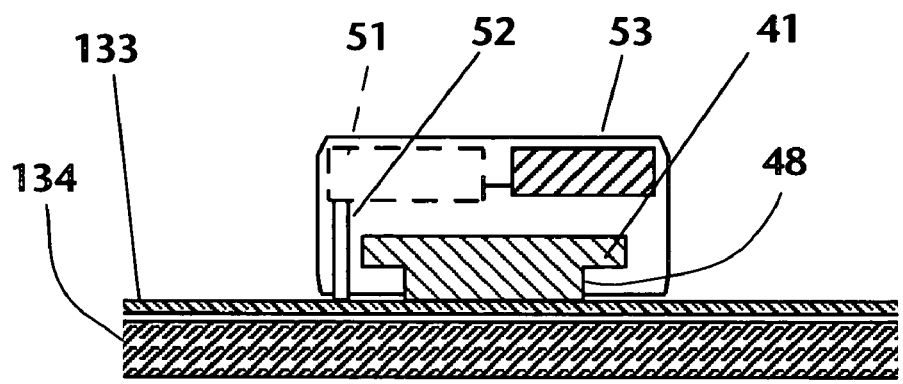
FIG. 20 is a cross-sectional end elevation of fader track mechanical control with fader cap for use in conjunction with a capacitive touch sensor device and an OLEP or LEP display or the equivalent.

The devices described herein may also be used with OLED and LEP and equivalent displays, which are typically very thin. With reference to FIG. 20, an OLED or LEP display 133 is secured adjacent to the outer surface of a capacitive touch screen device 134. (A layer of protective material may be disposed on the display.) A fader track controller as shown and described in FIG. 4 or elsewhere is removably secured to the outer surface of the display 133, with the stylus tip 52 thereof extending to the surface of the display 133. The touch signal from the stylus tip 52 is transmitted through the display 133 to the touch screen 134 to provoke a touch detection. One advantage of this arrangement is that the parallax associated with the thickness of a touch screen that is placed on top of a display, as known in the prior art, is eliminated by having the display on top of the sensing screen.

Figure 21:
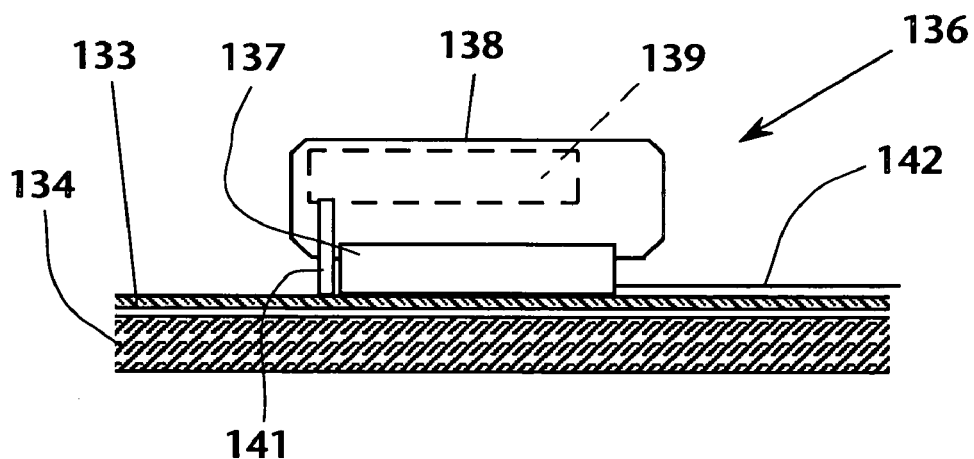
FIG. 21 is a cross-sectional end elevation of knob mechanical control with fader cap for use in conjunction with a capacitive touch sensor device and an OLEP or LEP display or the equivalent.

OLED and LEP displays and the like can have their bus bars printed on a plastic substrate by a special ink jet printing process. This same printing process may be used to print conductor traces directly on the top surface or bottom surface of the display web. With reference to FIG. 21, a display 133 is secured to a touch screen device 134 as described with reference to FIG. 20. A knob controller 136 includes a base 137 releasably adhered to the outer surface of display 133. A knob cap 138 is rotatably secured to the base, and a touch signal generator 139 within the cap is connected to a stylus tip 141 extending toward the display 133. A plurality of conductors 142 are printed on the display 133, and contacts on the bottom surface of the base 137 engage the conductors to power the signal generator 139. The traces may be coated with a thin protective polymer or equivalent as is common in the construction of touch screens. As described above, rotation of the cap 138 with the stylus 141 provokes a touch detection along the arcuate path of the stylus, and software interprets the arc length and velocity to form an input function for an associated computer or electronic device. The conductors 142 may be printed in discrete areas of the display 133, or may extend over the entire surface. The conductors may be placed at predetermined spacings to enable the connection of multiple devices 136 or other devices described herein. Note that no onboard battery or photovoltaic power supply is required for these devices.

With regard to FIG. 22, the invention provides a fader controller 143 that employs a capacitive touch sensing technique. Controller 143 includes a longitudinally extending web 144 formed of a material such as plastic, glass, metal, polymer, and the like. ("Web" is used herein to indicate a flat, thin, generally bendable sheet.) A pair of sensor electrodes 146 and 147 are secured to opposed ends of the web 144, and a coating 148 of transparent conductive material such as indium tin oxide (ITO) may be applied to the web 144 on the top surface, bottom surface, or within the web. Alternatively, a touch grid can be embedded in the web or applied to its surface, extending between the sensor electrodes. One or more power rails 149 (which may comprise thin conductors) extend longitudinally in the web and connect to the sensor electrodes. The sensor electrodes are connected to touch sensor circuitry and thence to a microprocessor. The touch sensor circuitry may be disposed adjacent to a graphic display on which the device 143 is placed, such as the display frame or bezel, or merely connected at the periphery of the display to touch sensor circuitry mounted elsewhere.

A finger touch at any point along the web 144 causes signals to be imparted to the sensors 146 and 147, and the ratio of these signals is interpreted by the software running on the microprocessor to detect the longitudinal position of the touch. A sliding touch along the web generates many touch points in sequence, and the extent and movement of the touch points may be interpreted as input commands to the microprocessor. Thus the controller 143 comprises a fader controller, with a sliding finger touch providing the control input. This sliding finger touch replaces the fader cap in mechanical faders known in the prior art.

The device 143 is fabricated of transparent materials, and may be adhered to the surface of a display, such as a flat panel display, CRT, OLED or LEP, Active Matrix, STN, or electroluminescent display. Thus touch sensor devices may be applied to a computer display that is otherwise devoid of touch input technology. Likewise, device 143 may be adhered to a cover glass, a superstrate surface, or the surface of a touch screen device. It may be installed in a groove in any of these named devices or surfaces. The advantages of this device include the following:

1) the device 143 eliminates the need for a fader cap, while at the same time providing a physical tactile device for operating a fader. There is no fader cap to wear out, nor to inflict wear on a fader track. It is easy to use a material that is much harder than human skin, so that wear on the web 144 is minimal;

2) the device 143 eliminates the need for a motorized fader. The fader cap is eliminated, and likewise the need to move a fader cap is obviated. A graphic representation of the fader position may be visualized through the transparent material of the web 144, and software may be used to move the representation to a preset value as well as changing the position in accordance with any finger touch. Thus the need for service and repair of motorized faders is eliminated;

3) the device 143 enables the user to operate the fader controller by touch alone, freeing the vision of the user for other tasks.

With regard to FIG. 23, the invention further provides a fader controller 152 that employs a resistive touch sensor technique. A longitudinally extending web 154 is formed of a material such as plastic, glass, metal, polymer, and the like. A pair of contacts 156 and 157 are secured to opposed ends of the web 144, and a resistive/conductive grid 158 is embedded in the web and extending between the sensor electrodes. The contacts are each connected to touch sensor circuitry and thence to a microprocessor. A finger touch at any point along the web 154 causes a voltage signal to be detected by sensors located external to controller 152 and electrically connected to contacts 156 and 157. The ratio of these signals is interpreted by the software running on the microprocessor to detect the longitudinal position of the touch. A sliding touch along the web generates many touch points in sequence, and the extent and movement of the touch points may be interpreted as input commands to the microprocessor. The advantages enumerated previously with respect to the embodiment of FIG. 22 also pertain to this embodiment.

To guide the sliding touch along the longitudinal extent of the web 144 or 154, the device may provide a ridge 149 protruding upwardly from the web 144 (or indented into the web) and extending longitudinally thereon, as shown in FIG. 24. The ridge 149 may include a shallow V shaped groove 151 extending longitudinally therealong. The ridge 149 serves as a finger guide to permit an individual to slide a fingertip along the axis of the web 144 without requiring visual guidance to orient the sliding touch. The groove 151 serves as a guide for the tip of a stylus or pen for the same purpose.

With regard to FIG. 26, any of the embodiments of FIGS. 22-24 may be configured in a closed curved loop 161 to define a touch sensor controller that emulates the circular rotation of a knob controller. A finger touch may describe a small angular excursion about the central axis, or may encompass many rotations about the central axis, and the relationship of the angular increment to the input variable may be set by a software function to provide any degree of resolution or range of a variable.

With reference to FIG. 25, a further embodiment of the invention includes a fader cap 160, constructed as described previously, to engage a track 41 secured to the outer surface of a display 161. A device 152 is secured to the upper surface of the display 161. A stylus tip 162 extends from an edge portion of the cap 160 to impinge on the top of the device 152 to provoke a touch response from the device. The user may place one or more fingers on the cap 160 and slide the cap along the track 41 to perform a control function, and the feel of the controller is very similar to a mechanical fader controller known in the prior art. The device may be applied to a graphic display or to a touch screen associated with a graphic display.

Figure 27:
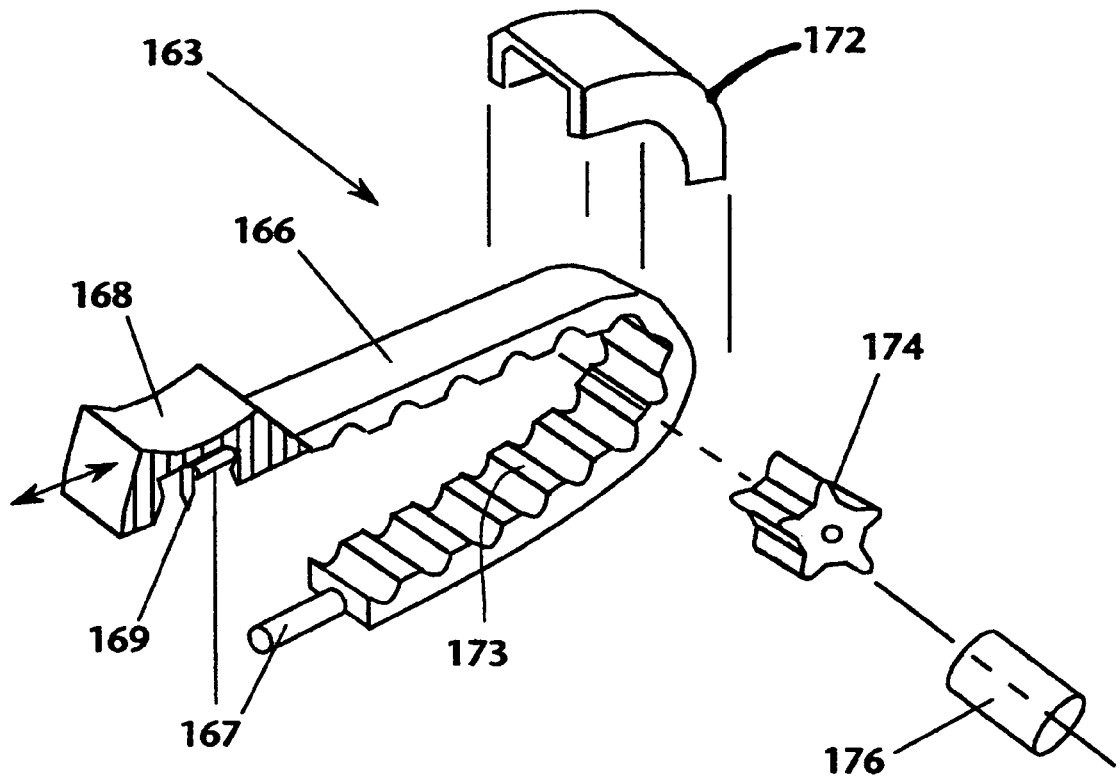
FIG. 27 is an exploded perspective view of a flexible track fader controller for use with a capacitive touch screen device.
Figure 28:
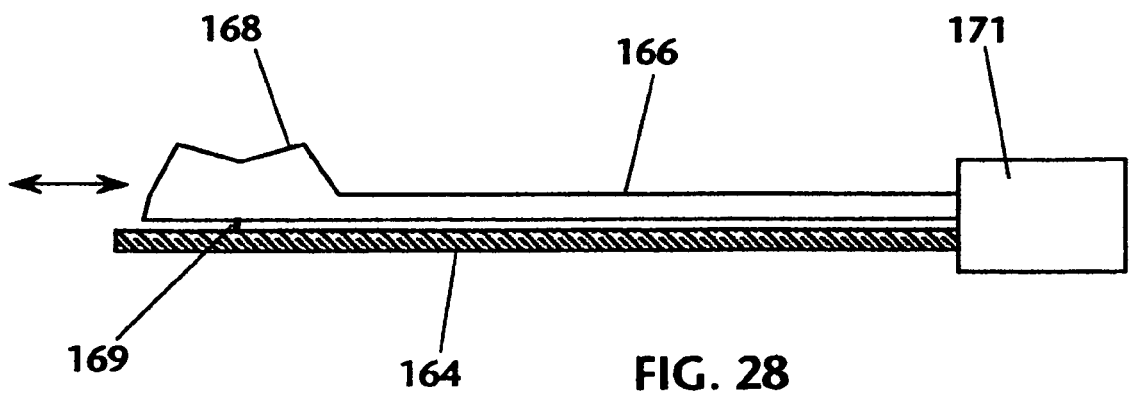
FIG. 28 is a side elevation of the flexible track fader controller of FIG. 27.

With regard to FIGS. 27 and 28, the invention further provides a fader controller 163 for a generalized touch screen device 164 that is mounted at the periphery of the touch screen device 164. A flexible track 166 includes a proximal end having a conductor 167 supported therein, the conductor extending the length of the track to a cap end 168. A stylus tip 169 extends from the cap 168 toward the touch screen 164. The track 166 extends through a half-loop bend within a housing 171 at the margin of the screen 164, and a keeper 172 within the housing serves as a guide to maintain the axial alignment of the track 166 as it is extended or retracted in the housing 171. The conductor may carry a touch signal to the tip 169, which in turn provokes a touch response from the touch screen 164. The keeper may also influence the angle at which the track 166 engages the screen 164 to assure that the tip 169 impinges on the touch screen.

The track 166 may be provided with a smooth, toothed or ribbed surface 173 that is passed about a drive sprocket 174. A motor 176 connected to the drive sprocket is controlled by a software function to rotate and drive the flexible track 166 to extend or retract to any preset length representing any given value. Thereafter, the operator may use fingertip pressure applied to the end cap of the flexible track to further extend or retract the track, the stylus tip traversing the touch screen and imparting a moving touch point thereto. For use with electronic display devices that have no touch screen associated therewith, the extension and retraction of the track 166 may be sensed by a shaft encoder or the equivalent coupled to the motor output 176, and software may convert the shaft movement and position into a display graphic that tracks the position of the cap end 168. This technology is described in copending application Ser. No. 09/551,484, filed Apr. 18, 2000 by the present inventors.

The device of FIGS. 27 and 28 comprises a mechanical fader controller that requires no structure mounted on a touch screen, yet is capable of interacting with a touch screen. There are no alterations required for the touch screen or display, nor any adhesives used on their surfaces. The track 166 may be made of a transparent material to enhance visibility therethrough. The added motor drive provides a fully motorized fader controller, as is known in the prior art, though the motor drive is not required for operation. For use with a resistive touch screen, the sensor tip may extend from the flexible track a sufficient distance to comprise the primary bearing point of the track on the screen.

Figure 29:
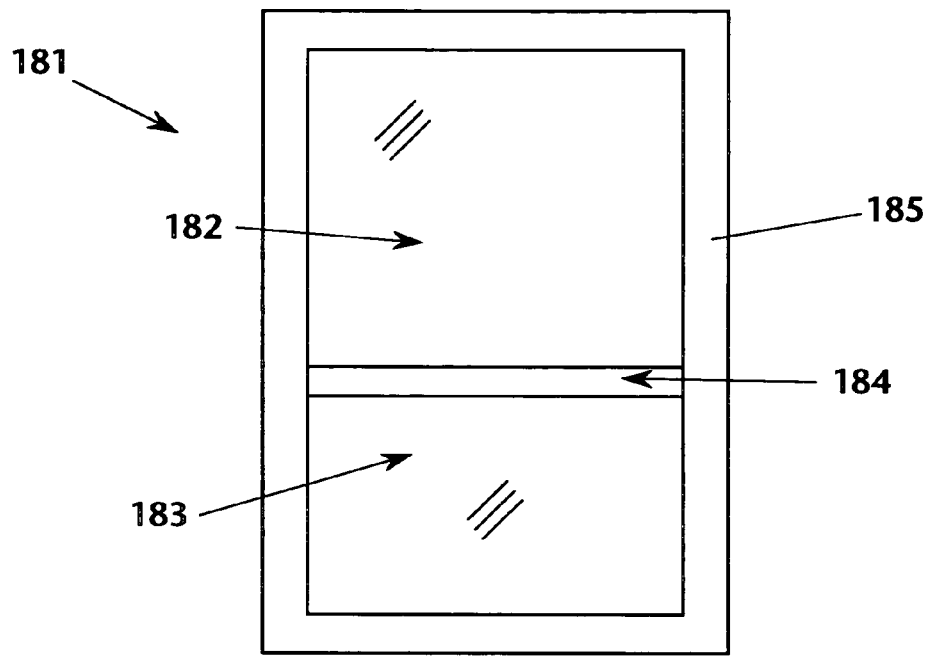
FIG. 29 is a plan view of a resistive touch screen device having discrete sensing areas for simultaneous detection of multiple touches.

A further aspect of the invention is the provision of touch screen devices modified to detect a plurality of discrete touch points simultaneously, whereby a plurality of the various controller devices described herein may be used in conjunction with a single touch screen, and more than one controller may be employed at the same time. With regard to FIGS. 29 and 30, a touch screen assembly 181 provides a plurality of discrete sensing areas 182 and 183 (and more, as necessary) within a single touch screen within a bezel 185. The touch screen assembly is associated with a display that is controlled by a processor that receives inputs from the touch screen. The sensing areas are separated by a boundary zone 184 that is not touch sensitive. Each sensing area may host one of the touch screen controller devices described above that is adapted for use with a resistive touch screen. In this way multiple controllers may be used with a single touch screen and a single display.

Figure 30:
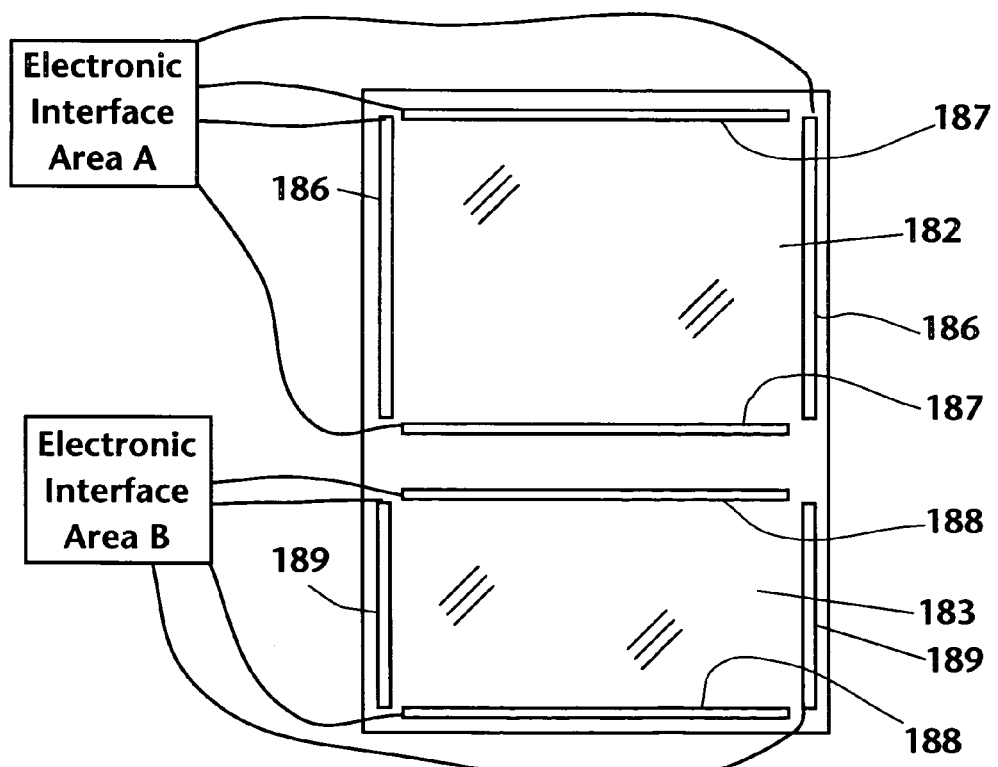
FIG. 30 is a schematic view of the resistive touch screen device of FIG. 29.

The resistive touch screen employs a conductive, transparent layer extending between sensing electrodes, as in generally known and used in the prior art. With reference to FIG. 30, sensing area 182 is bounded by a pair of electrodes 186 spaced apart in the Cartesian X direction and a pair of electrodes 187 spaced apart in the Y direction. Likewise, the sensing area 183 is bounded by electrodes 189 and 188 in the X and Y directions. The boundary zone 184 between the adjacent electrodes 187 and 188 may be minimized by forming the electrodes as microtraces in the screen material, and by software modeling that combines the touch sensing of both areas in a seamless manner, so that a moving touch may be passed from one area to the other without interruption. Thus the overall touch screen assembly 181 appears to contain a single touch screen, with the added feature that each sensing area may support a respective separate controller of this invention, and all such controllers may be detected and operated simultaneously. A greater plurality of sensing areas may be provided for larger numbers of controllers. It is noted that this same technique of placing multiple sets of sensor electrodes for multiple areas within a single touch screen assembly may be applied to capacitive touch screen devices.

Additionally, for capacitive sensor touch screen devices, a plurality of mechanical controllers designated for capacitive touch sensors as described above may be operated simultaneously in accordance with the invention. The system employs multiple discrete band (MDB) RF touch position determination system (TPDS). The MDB TPDS includes four identical multi-band RF transmitter/detector units disposed symmetrically at the margin of the capacitive touch screen. The transmitter/detector units are all capable of resolving discrete RF bands. The touch signal generator of each controller is assigned a predetermined frequency within a respective discrete band that is unique among all the devices being used with a touch screen device. The transmitter/detector units are adapted to receive the discrete signals of the plurality of mechanical controllers, and to evaluate each discrete signal to determine the touch point of each mechanical controller. The number of devices used is limited only by the filter bandwidth and the processing power of the electronic interface. An alternative to this approach is to use discrete bands of IR (infrared light) rather than RF. Each device emits a signal within a discrete IR band, and the sensing receivers are filtered to distinguish the signals in each band.

Figure 31:
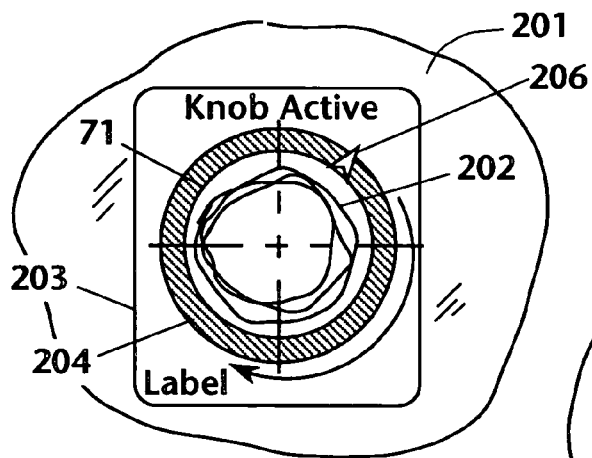
FIGS. 31-34 are plan views depicting various controller emulations for controller devices of the invention evoked under software control.

A further aspect of the invention is the software that may be used to interpret and carry out control inputs that are entered using the devices described herein. With regard to FIG. 31, the devices described herein, particularly those depicted in FIGS. 11 and 12, may be used in any of several ways. Whenever a knob controller 71 (or 71') is placed (self-adhered) on a touch screen device, the user initiates operation of the controller by actuating it in any of several particular ways to evoke a respective controller function. For example, as shown in FIGS. 11 and 31, when the device 71 is placed on resistive touch screen 201 and initiated with a series of circular finger motions, the touch screen device 201 detects a plurality of touch points in a plurality of loop paths 202. The software running on the associated computer system uses the loop patterns 202 to calculate the center position of the placement of a knob on the touch screen. When the device is located by the center of its placed location being determined, any number of functions for this device can be selected in a menu or by selection graphics or alphanumeric indicia that are generated by the display in relative proximity to the device 71. An example of four such functions are: rotary knob, directional knob, joystick, and mouse controller.

Regarding the rotary knob function, initial circular movements of the knob are used to determine its location. Subsequent circular movements of the knob are converted by software into increases or decreases in the value associated with the knob, with the magnitude of the angular excursion correlated with the magnitude of the change in value. The changing value may be displayed by indicia and/or graphic means. If circular rotations to the right are converted into value increases, then circular rotations to the left are converted into decreases, and vice versa.

Using the calculated center position of a placed device 71, software can place any type of graphics near or around the knob. These graphics may include an emulated light ring 204, a device name or label, and/or a parameter (numerical value) that changes when the device is operated. Thus, for example, any circular finger touch on the controller 71 will cause the knob pointer 206 of the graphic representation 203 to rotate about the band 204. This in turn causes the value of the parameter assigned to the device to increase or decrease.

The rotary operation of knob controller 71 is well suited for operations in which each 360° motion is equal to a predetermined amount of value change. Portions of a circle or small arcs can yield touch points that can be converted through software to small angle changes in value. Or, the amount of change that is represented by a single 360° circular motion can be changed to a wide range of values. For instance, the scale may be set so that one complete circle about the controller 71 equals $1/10^{th}$ of a decibel, or may be set so that one complete circle equals 10 decibels.

Figure 32:
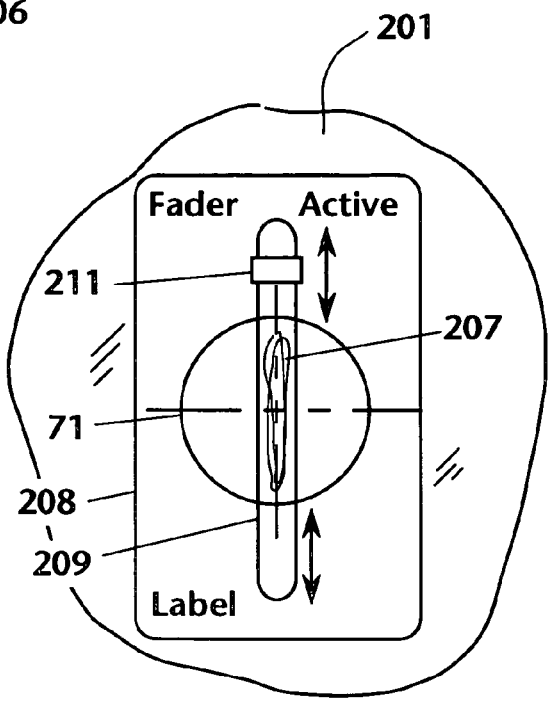

As another example, with regard to FIG. 32, the device 71 is placed on resistive touch screen 201 and the directional knob function is selected. Finger touches that are generally linear and back and forth along orthogonal axes generate very few touch detections. The placement of device 71 is detected by the same method as described previously. The device is operated by pushing up or down (north/south) or right or left (east/west). A northward push on the knob 71 provokes a touch detection displaced from the calculated center position of the controller, and the software recognizes this action as a command to increase the value of the parameter. The increase in the parameter is proportional to the amount of time that the northward touch is maintained. Likewise, a southward push on the knob causes the software to decrease the parameter value.

In addition, the user may initiate a northward push to increase the parameter value, and then rotate the touch toward the east position, the rate of increase of the parameter value is reduced. If the rotated touch continues toward the southern quadrant, the parameter value begins to decrease, and reaches a maximum rate of decrease when the touch rotates to the south position. Note that the choice of directions for increase/decrease is arbitrary, and may be selected for convenience and compatibility. The software causes the display to present a graphic representation 208 that indicates a directional knob function, the parameter label, and its current value.

Figure 33:
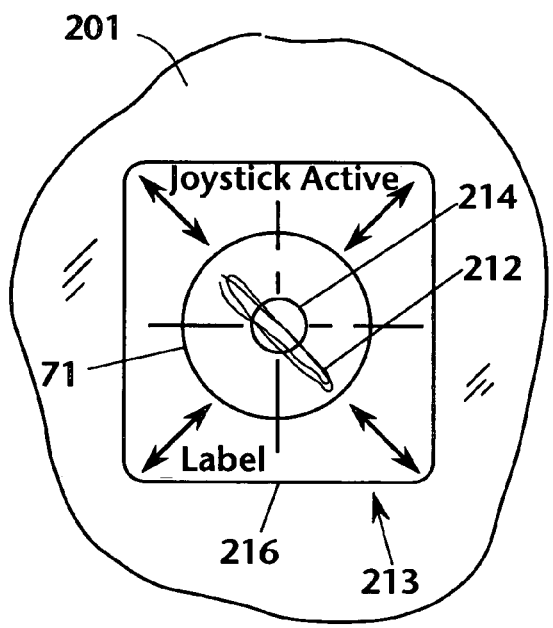

With regard to FIG. 33, a further function that may be evoked during initiation of a device is a joystick. As with the other functions of device 71, when the device is first placed on the display 201, a series of circular motions are performed and the touch detections thus provoked are interpreted by the software to calculate the center of the location of the device 71. Thereafter the joystick function is selected from an on-screen menu (or the equivalent, for example, a vocal command), and the software directs a graphic representation 213 closely spaced to the calculated center of device 71.

The graphic representation 213 may include an enclosed box or FIG. 216, a joystick knob symbol 214, and functional indicia ("Joystick Active") and the parameter or value being controlled ("Label") and its current value. Any suitable graphic or iconic symbol may be used. As the user applies finger pressure to the device 71 in any direction, the touch detection 212 provoked thereby is displaced from the calculated center, and the angle of the displaced touch is used to move the knob representation 214 in the same angular direction on the display.

Movement of knob 214 (or a cursor or other object controlled by the joystick) is set at a fixed speed by the software, and this speed may be changed by menu selection or the like. In this regard the embodiment is analogous to a switch joystick function known in the prior art. Alternatively, the software may be set so that the speed of movement in any angular direction is proportional to the amount of time that the knob 71 is pushed in any direction.

Figure 34:
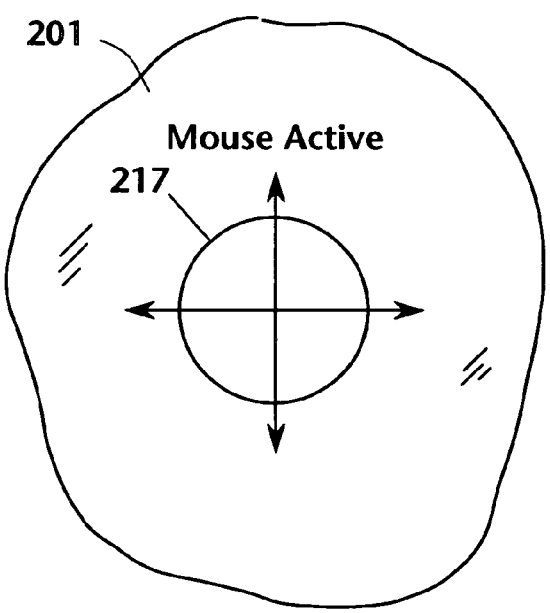

As an alternative embodiment to FIG. 33, the linear oblique initial inputs may be correlated to evoke a mouse function, as shown in FIG. 34, in which a cursor may be driven to any point of the associated display. A graphic representation 217 may be presented with a label ("Mouse Active") that sets forth the function.

In all the embodiments of FIGS. 31-34, the software applies a mathematical function that correlates any excursion of the touch points from the average center position, including the angle about the center position, and the distance and time of the excursion, with changes in the labeled value or parameter. This function may be linear or nonlinear, bounded or unbounded, as is appropriate for the item being controlled. The software changes the position of the graphic display as appropriate. It is significant that the software enables one controller 71 to perform all four controller operations: rotary knob, directional knob, joystick, and mouse controller. Although the device 71 is adapted for use with resistive touch screens, the software functions described above may be applied to controller devices described herein for use with capacitive touch screens.

The selection of various functional controller emulations, as in FIGS. 31-34, using initiating movement of a newly placed controller, may be applied where appropriate to any of the fader, knob, or joystick controllers described herein.

Figure 35:
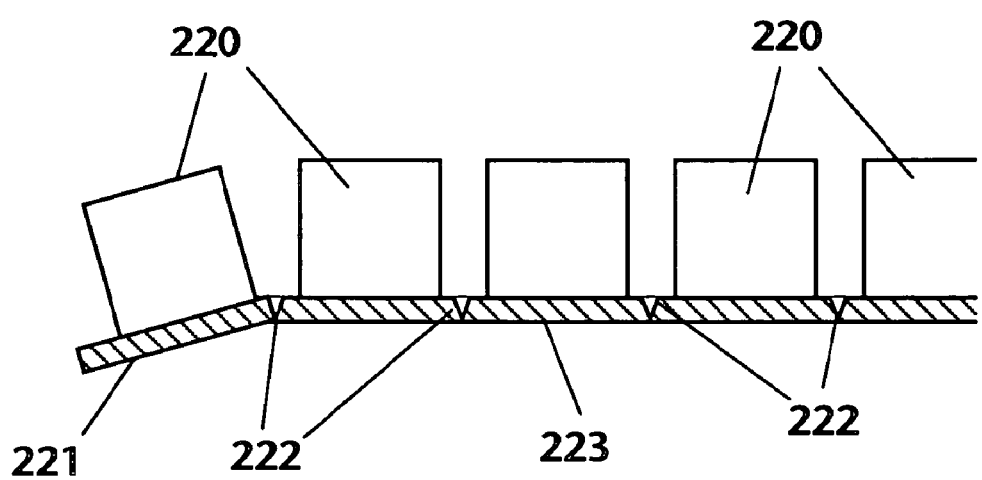
FIG. 35 is an end view of a plurality of controller devices for a touch screen in accordance with the invention, provided as components on a crack-and-peel sheet.

The various embodiments of controller devices described herein are generally designed to interact with touch screen devices, and to be simple, inexpensive assemblies that rely on the touch screen and associated software for functionality and resolution. With regard to FIG. 35, the controller devices of the invention may be provided as a group of devices 220, here representing any of the controller devices described herein (all the same or a variety selection of knobs and faders, etc.) The devices 220 are secured to a common scrim 221 that is scored at separating lines 222. The scrim 221 may incorporate the self-adhering base component of the respective knob, fader track, joystick, or the like. The user may separate a device from the group along a scored line 222, and peel away a bottom release layer 223 to expose the adhesive. The separated device may then be applied directly to a touch screen device and used as described herein. This is termed crack-and-peel packaging. Each device may be removed from a touch screen and reused many times, and ultimately discarded.

The controller devices for use with touch screens as described herein exhibit the following advantages over the prior art:

1. These devices cost far less to manufacture that prior art controllers, because they require either a very simple electronic circuit or no circuit at all, depending on the implementation of the device.

2. Many of the embodiments herein do not require any type of edge connector to be operational, and thus may be placed anywhere on the surface of a display, touch screen or its cover glass. These embodiments permit faders and knobs to be placed in the middle of the touch screen, rather than requiring placement adjacent to the edge of a touch screen.

3. Many of these devices may be operated with no conductors of any kind connected thereto.

4. These devices require no dedicated circuit for converting analog signals to digital signals. This conversion is performed by the touch sensor circuitry that is part of the touch screen.

5. There are no complex mechanical parts in the controllers to require maintenance or to fail.

6. Many of these controller devices for touch screens, including fader tracks, may be presented on crack-and-peel sheets, a very inexpensive means of marketing the product.

7. These controller devices may be removed and replaced at will on the surface of a touch screen or its equivalent.

8. One touch screen device and one software package replace a large number of expensive, discrete electromechanical controllers, resulting in the same functionality at far less cost.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A device for providing input to a generally flat touch screen, including:
   a base member and means for securing said base member to the touch screen;
   means associated with said base member for provoking a touch detection by the touch screen;
   said base member including a longitudinally extending rib having a bottom surface adapted to impinge on the touch screen;
   further including a fader cap, and means for securing said fader cap to said rib in longitudinally sliding fashion;
   a stylus tip extending from said cap toward said touch screen;
   wherein the touch screen is adapted to detect the position of a touch signal applied thereto, said fader cap including means for generating said touch signal and transmitting said touch signal through said stylus tip to said touch screen;
   power supply means in said fader cap for driving said touch signal generating means, said power supply means including a battery.

2. A device for providing input to a generally flat touch screen, including:
   a base member and means for securing said base member to the touch screen;
   means associated with said base member for provoking a touch detection by the touch screen;
   said base member including a longitudinally extending rib having a bottom surface adapted to impinge on the touch screen;
   further including a fader cap, and means for securing said fader cap to said rib in longitudinally sliding fashion;
   a stylus tip extending from said cap toward said touch screen;
   wherein the touch screen is adapted to detect the position of a touch signal applied thereto, said fader cap including means for generating said touch signal and transmitting said touch signal through said stylus tip to said touch screen;
   power supply means in said fader cap for driving said touch signal generating means, said power supply means including a photovoltaic cell.

3. A system for providing input to a generally flat touch screen, including:
   a plurality of devices for interacting with the touch screen, each device including a base member and means for securing said base member to the touch screen;

means associated with said base member for provoking a touch detection by the touch screen;
wherein said plurality of said devices are joined in a crack-and-peel sheet.

4. A device for providing input to a generally flat touch screen, including:
a base member and means for securing said base member to the touch screen;
means associated with said base member for provoking a touch detection by the touch screen;
said base member comprising a post having a bottom surface adapted to impinge on the touch screen;
further including a knob cap secured coaxially to said post and adapted for rotation about a common axis;
a stylus tip extending from said knob cap toward said touch screen;
said touch screen being adapted to detect the position of a touch signal applied thereto, said knob cap including means for generating said touch signal and transmitting said touch signal through said stylus tip to said touch screen;
power supply means in said knob cap for driving said touch signal generating means, said power supply means including a photovoltaic cell.

5. A device for providing input to a generally flat touch screen, including:
a base member and means for securing said base member to the touch screen;
means associated with said base member for provoking a touch detection by the touch screen;
said base member comprising a post having a bottom surface adapted to impinge on the touch screen;
further including a computer having a graphic display associated with the touch screen, and software means for receiving touch input provoked by said post with fingertip pressure, said software means including means for analyzing touch inputs provoked by said post with fingertip pressure and emulating specific diverse controller characteristics in response to said touch inputs;
said software means including means for analyzing initial touch inputs provoked by said post with fingertip pressure and determining the center point of said initial touch inputs,
said software means providing a joystick controller emulation and interpreting a linear touch pattern at any angle from said center point as a command to move a graphic at the same angle on the display, wherein the rate of movement of the graphic is set by said software means.

6. A device for providing input to a generally flat touch screen, including:
a base member and means for securing said base member to the touch screen;
means associated with said base member for provoking a touch detection by the touch screen;
said base member comprising a post having a bottom surface adapted to impinge on the touch screen;
further including a computer having a graphic display associated with the touch screen, and software means for receiving touch input provoked by said post with fingertip pressure, said software means including means for analyzing touch inputs provoked by said post with fingertip pressure and emulating specific diverse controller characteristics in response to said touch inputs;
said software means including means for analyzing initial touch inputs provoked by said post with fingertip pressure and determining the center point of said initial touch inputs;
said software means providing a joystick controller emulation and interpreting a linear touch pattern at any angle from said center point as a command to move a graphic at the same angle on the display, wherein the rate of movement of the graphic is proportional to the amount of time that a touch detection is maintained at any given angle.

7. A device for providing input to a generally flat touch screen, including:
a base member and means for securing said base member to the touch screen;
means associated with said base member for provoking a touch detection by the touch screen;
said base member comprising a post having a bottom surface adapted to impinge on the touch screen;
further including a computer having a graphic display associated with the touch screen, and software means for receiving touch input provoked by said post with fingertip pressure, said software means including means for analyzing touch inputs provoked by said post with fingertip pressure and emulating specific diverse controller characteristics in response to said touch inputs;
said software means including means for analyzing initial touch inputs provoked by said post with fingertip pressure and determining the center point of said initial touch inputs;
said software means providing a mouse controller emulation and interpreting a touch detection displaced from said center point at an angle thereabout as a command to move a cursor at the same angle on the display.

8. A device for providing input to a generally flat touch screen, including:
a base member and means for securing said base member to the touch screen;
means associated with said base member for provoking a touch detection by the touch screen;
said base member defining a bottom opening, a control rod having a lower end with a stylus tip, and means for supporting said control rod on said base member with said stylus tip spaced closely to the touch screen to provoke a touch detection;
said means for supporting said control rod including a universal bearing engaging a medial portion of said control rod; and,
a membrane extending radially from said control rod to said base member, said membrane formed of an elastic, resilient web.

9. A device for providing input to a generally flat touch screen having a peripheral edge, including:
a flexible track mounted at the peripheral edge of the touch screen, said flexible track being extendable along an axis extending inwardly on said screen;
means extending from said flexible track for provoking a touch detection by said touch screen; and,
means for detecting extension and retraction of said flexible track with respect to the peripheral edge of the touch screen and correlating the extension and retraction with a controller function;
wherein said means for detecting includes a spindle about which said flexible track is passed, and means for sensing rotation of said spindle and converting said rotational data into location coordinates of said cap end of said flexible track;
said spindle including radial teeth, and said flexible track includes a toothed surface adapted to engage said radial teeth.

10. A device for providing input to a generally flat touch screen having a peripheral edge, including:
- a flexible track mounted at the peripheral edge of the touch screen, said flexible track being extendable along an axis extending inwardly on said screen;
- means extending from said flexible track for provoking a touch detection by said touch screen; and,
- means for detecting extension and retraction of said flexible track with respect to the peripheral edge of the touch screen and correlating the extension and retraction with a controller function;
- wherein said means for detecting includes a spindle about which said flexible track is passed, and means for sensing rotation of said spindle and converting said rotational data into location coordinates of said cap end of said flexible track;
- further including motor means for driving said spindle to extend and retract said flexible track with respect to the peripheral edge of the touch screen.

11. A device for providing input to a generally flat touch screen, including:
- a base member and means for securing said base member to the touch screen;
- means associated with said base member for provoking a touch detection by the touch screen;
- said base member including a longitudinally extending rib having a bottom surface adapted to impinge on the touch screen;
- further including a fader cap, and means for securing said fader cap to said rib in longitudinally sliding fashion;
- a stylus tip extending from said cap toward said touch screen;
- wherein the touch screen is adapted to detect the position of a touch signal applied thereto, said fader cap including means for generating said touch signal and transmitting said touch signal through said stylus tip to said touch screen; further including power supply means in said fader cap for driving said touch signal generating means, said power supply means including a battery;
- said fader cap including touch switch means for connecting said battery to said touch signal generator means in response to fingertip touch on said fader cap.

* * * * *